(12) United States Patent
Brown et al.

(10) Patent No.: US 7,679,804 B2
(45) Date of Patent: Mar. 16, 2010

(54) NON-RESONANT DRIVE FOR ADAPTIVE TRAJECTORY OF A SCANNER SYSTEM HAVING A MEMS DEVICE

(75) Inventors: Dean R. Brown, Lynnwood, WA (US); Wyatt O. Davis, Bothell, WA (US); Gregory T. Gibson, Snohomish, WA (US); Richard A. James, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 322 days.

(21) Appl. No.: 11/796,230

(22) Filed: Apr. 26, 2007

(65) Prior Publication Data

US 2008/0266627 A1 Oct. 30, 2008

(51) Int. Cl.
*G02B 26/08* (2006.01)
(52) U.S. Cl. .................................... 359/223.1
(58) Field of Classification Search ... 359/223.1–226.1, 359/290, 291
See application file for complete search history.

(56) References Cited

U.S. PATENT DOCUMENTS

| | | | |
|---|---|---|---|
| 4,000,397 A | 12/1976 | Hebert et al. | |
| 4,020,357 A | 4/1977 | Punis | |
| 4,091,379 A | 5/1978 | Wu et al. | |
| 4,158,435 A | 6/1979 | Nakanishi et al. | |
| 4,335,301 A | 6/1982 | Palmer et al. | |
| 4,528,444 A | 7/1985 | Hara et al. | |
| 4,740,675 A | 4/1988 | Brosnan et al. | |
| 4,749,879 A | 6/1988 | Peterson et al. | |
| 4,777,357 A | 10/1988 | Harada et al. | |
| 4,782,219 A | 11/1988 | Crater | |
| 4,798,943 A | 1/1989 | Cherry | |
| 4,933,538 A | 6/1990 | Heiman et al. | |
| 5,272,323 A | 12/1993 | Martino | |
| 5,302,813 A | 4/1994 | Goren | |
| 5,408,081 A | 4/1995 | Barkan | |
| 5,436,440 A | 7/1995 | Barkan | |
| 5,446,272 A | 8/1995 | Barkan | |
| 5,449,893 A | 9/1995 | Bridgelall et al. | |
| 5,463,211 A | 10/1995 | Arends et al. | |
| 5,475,208 A | 12/1995 | Marom | |
| 5,545,888 A | 8/1996 | Barkan et al. | |
| 5,557,094 A | 9/1996 | Barkan | |
| 5,581,072 A | 12/1996 | Bridgelall et al. | |
| 5,606,447 A | 2/1997 | Asada et al. | |
| 5,612,531 A | 3/1997 | Barkan et al. | |
| 5,705,799 A | 1/1998 | Li | |
| 5,811,782 A | 9/1998 | Sato et al. | |

(Continued)

*Primary Examiner*—Euncha P Cherry
(74) *Attorney, Agent, or Firm*—Kevin D. Wills

(57) ABSTRACT

Briefly, in accordance with one or more embodiments, a MEMS device for a scanner system may be driven in a non-resonant mode of operation. The drive signal provided to the MEMS device may be tailored to prevent the MEMS device from exhibiting resonance characteristics and to cause the MEMS device to operate non-resonantly. In one or more embodiments, a filter may be used to tailor the frequency components of the drive signal, for example to sufficiently attenuate frequency components at or near the resonant frequency of the drive signal. A direct current signal may be provided to the MEMS device to provide an offset to scanned light beam for example to provide beam steering, and the sweep range and/or sweep frequency may be adjusted for example to steer the scanning field of view off axis from the user pointing axis.

28 Claims, 11 Drawing Sheets

U.S. PATENT DOCUMENTS

| | | |
|---|---|---|
| 5,852,286 A | 12/1998 | Coleman |
| 5,923,023 A | 7/1999 | Arends et al. |
| 5,925,868 A | 7/1999 | Arends et al. |
| 5,949,054 A | 9/1999 | Karpen et al. |
| 6,000,616 A | 12/1999 | Spitz |
| 6,073,849 A | 6/2000 | Colley et al. |
| 6,155,490 A | 12/2000 | Ackley |
| 6,189,794 B1 | 2/2001 | Iwaguchi et al. |
| 6,343,741 B1 | 2/2002 | Arends et al. |
| 6,382,511 B1 | 5/2002 | Tang et al. |
| 6,502,751 B1 | 1/2003 | Tang |
| 6,874,688 B1 | 4/2005 | Barkan et al. |
| 6,938,824 B2 | 9/2005 | Madej et al. |
| 7,148,591 B2 | 12/2006 | Mizoguchi et al. |
| 2003/0053232 A1 | 3/2003 | Dalziel |
| 2005/0253055 A1* | 11/2005 | Sprague et al. ............. 250/234 |

* cited by examiner

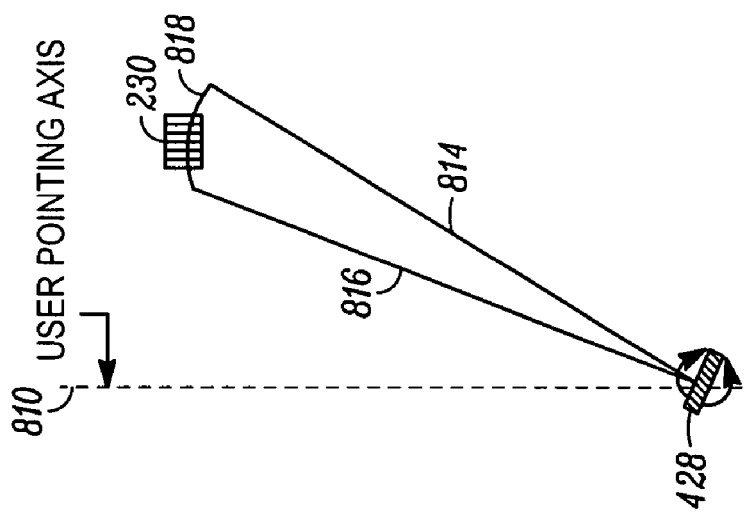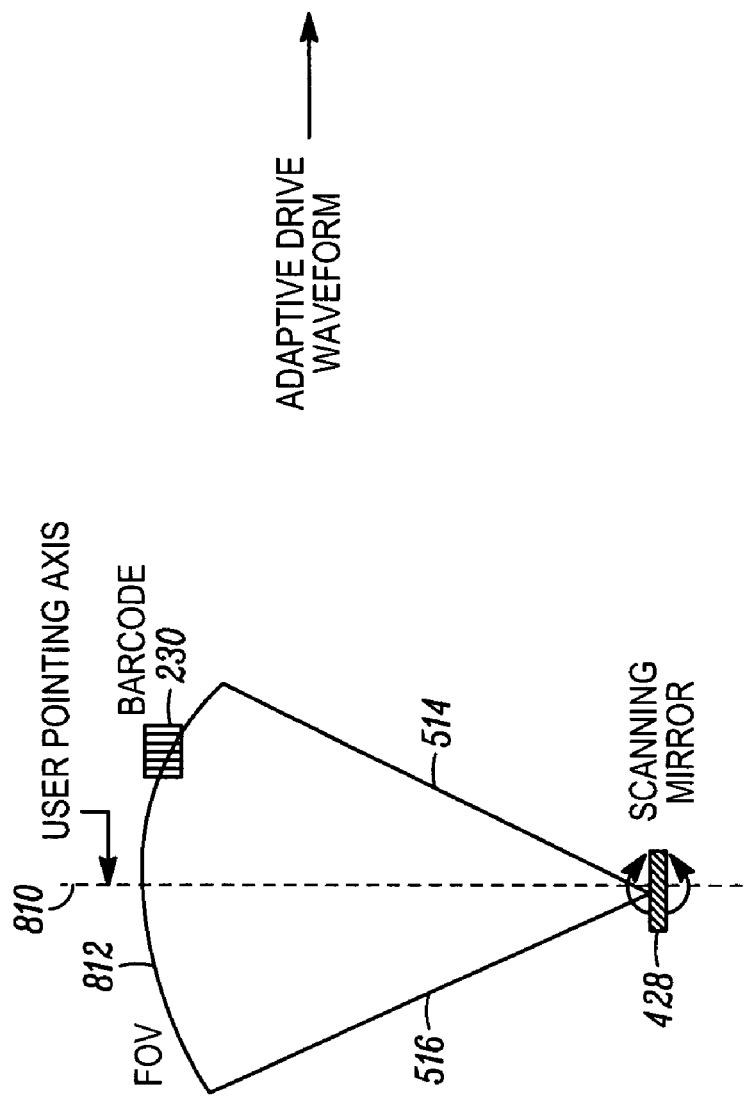

NON-RESONANT DRIVE FOR ADAPTIVE TRAJECTORY OF A SCANNER SYSTEM HAVING A MEMS DEVICE

BACKGROUND

In a scanner system having a microelectromechanical system (MEMS) device, a mirror of the MEMS device is used to scan a beam of light within a field of view. Often, mechanical resonance of the mirror is relied upon as the operating mode because of a limited available actuation force amplitude. A resonance driven mirror typically cannot produce beam trajectories that deviate significantly from a sinusoid. Thus, a resonance driven mirror provides limited options for trajectories of the scanning beam.

Typically, a mirror of a MEMS device is driven with a sinusoidal signal to oscillate the scanning beam in a sinusoidal pattern. Such sinusoidal scanning generally involves correction for the variable speed of a scanned beam of light when the beam is used to create a display or to read barcode information. This speed correction generally involves some inherent computational burden. Resonant operation of a mirror of a MEMS device additionally limits the options for beam trajectories since resonant operation is generally only sinusoidal and symmetric about a rest position, and the scan frequencies are limited to a narrow range near the resonant frequency of the mirror where the mirror has significant response.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIG. 8 is a diagram illustrating the ability to direct a mirror of a scanner system to a sub-portion of a field of view of the scanner to scan a target located away from a user pointing axis in accordance with one or more embodiments;

Figure 1:
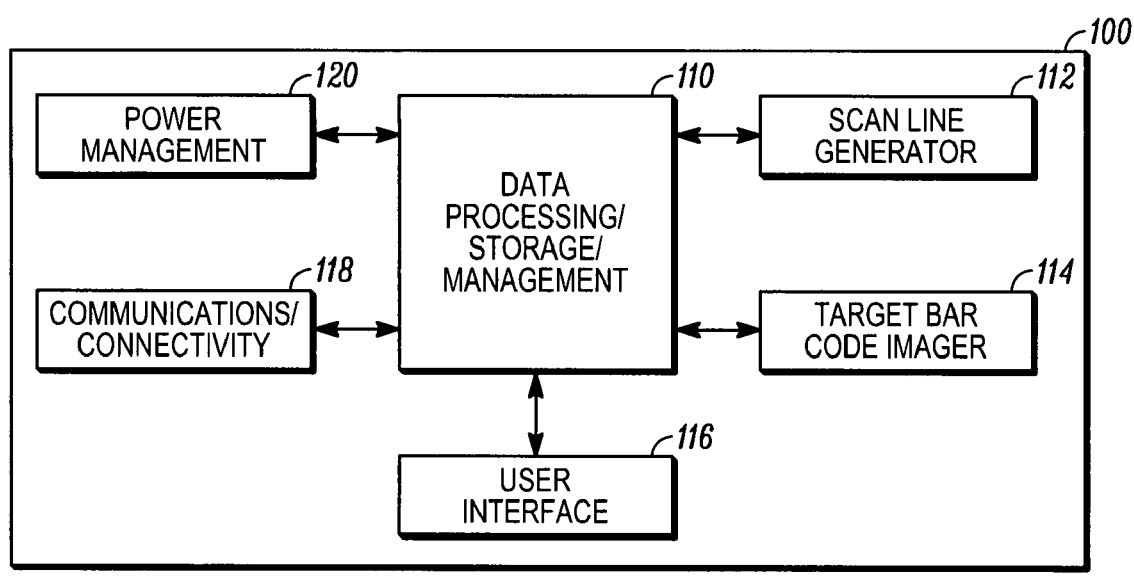
FIG. 1 is a block diagram of a scanner system in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a scanner system in accordance with one or more embodiments will be discussed. As shown in FIG. 1, scanner system 100 may comprise a data processing, storage, and management block 110. In general, the data processing, storage, and management block may be referred to as processor 110. Processor 110 may send control signals to scan line generator block 112 to cause scan line generator 112 to generate a laser beam swept across a target such as a bar code in a generally linear sweep across the target. In one or more embodiments, scan line generator 112 may generate a linear sweep scan line in one dimension, for example to read a one-dimensional type bar code, and in one or more alternative embodiments, scan line generator 112 may generate a non-linear sweep scan, and/or or a scan along two scan lines that may be orthogonal to one another, and/or non-orthogonal in some embodiments, for example to read a two-dimensional type bar code or other code or symbol, although the scope of the claimed subject matter is not limited in these respects. In general, a sweep scan may also refer to a sweep range or a scan angle.

Scanner system 100 may comprise a target bar code imager 114 that is capable of capturing light emitted from scan line generator 112 that is reflected off of the target bar code as a reflectance profile of the target to convert the reflectance profile into an electrical signal representative of information stored in the target bar code. Target bar code imager 114 then sends the reflectance profile signal to processor 110 for decoding of the information stored in the target bar code.

In one or more embodiments, scanner system 100 may further include a user interface 116 capable of allowing a user to control scanner system 100. For example, user interface 116 may include one or more buttons or other actuators to cause scan line generator 112 emit the scan line to capture the target bar code. User interface 116 optionally may include devices for indicating to a user that a target bar code was successfully scanned, for example one or more lights, displays, speakers, and so on, and/or to provide other operational information to the user to assist the user in operating scanner system 100.

In addition, scanner system 100 may include a communications/connectivity block 118 that includes circuits for allowing scanner system 100 to connect to one or more other devices, for example to send information obtained from scanned targets to remote devices such as a computer, server, and/or other type of information handling system. Furthermore, communications/connectivity block 118 may provide one or more interfaces capable of allowing scanner system 100 to be utilized in conjunction with such other devices, for example with such another device may comprise a point of sale (POS) terminal that may utilize scanner system 100 to capture target bar codes disposed on goods sold by a user operating the POS terminal. Furthermore, communications/connectivity block 118 may include various interfaces to allow scanner system 100 to be updated with new programs or software to be stored in and/or executed by processor 110. Communications/connectivity block 118 optionally may include one or more wireless communication systems to allow scanner system 100 to communicate with one or more remote devices via a wireless communication link. Such wireless communication links may comprise, for example, an infrared type communication link, a Bluetooth type communication link, an Institute of Electrical and Electronics Engineers (IEEE) 802.11a/b/g/n type communication link, a broadband type communication link such as a Third Generation Partnership Project (3GPP) type cellular communication link or a Wireless Interoperability for Microwave Access (WiMAX) type communication link, and so on, although the scope of the claimed subject matter is not limited in these respects. In addition, scanner system 100 may include a power management block 120 that is capable of controlling and/or managing the operational power utilized by scanner system. For example, power management block 120 may power down scan line generator 112 when target bar codes are not being captured after a predetermined period of time to conserve power such as when scanner system 100 is being powered by a battery.

Figure 2:
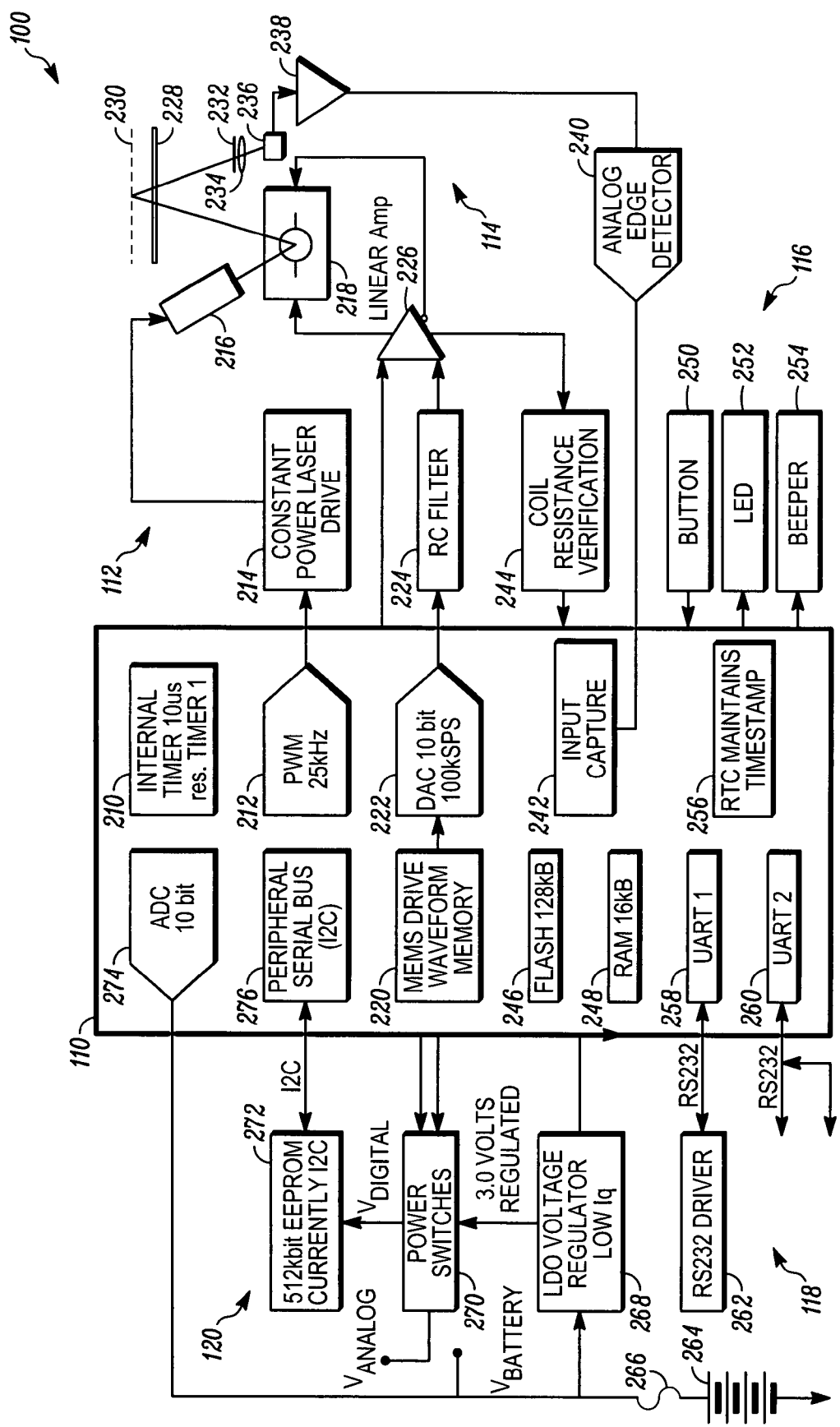
FIG. 2 is a block diagram of a scanner system showing subcomponents of the scanner system in accordance with one or more embodiments.

Referring now to FIG. 2, a block diagram of a scanner system showing subcomponents of the scanner system in accordance with one or more embodiments will be discussed. The diagram shown in FIG. 2 is one particular embodiment of scanner system 100 of FIG. 1. However, other variations of the particular subcomponents of scanner system 100 may be utilized, including more or fewer components, or substitute or alternative components, and the scope of the claimed subject matter is not limited in these respects. As shown in FIG. 2, scanner system 100 generally corresponds to one particular embodiment of scanner system 100 of FIG. 1, including processor 110, scan line generator 112, target bar code imager 114, user interface 116, communications/connectivity block 118, and/or power management block 120. Processor 110 may comprise an internal timer 210 to provide a timing reference for scanner system 100. In one or more embodiments, the period of the timing reference may comprise 10 microseconds, although the scope of the claimed subject matter is not limited in this respect. A pulse width modulator 212 may generate a pulse signal to constant power laser drive 214 to provide a signal for driving laser 216. In response to the driving signal received from constant power laser drive 214, laser 216 may emit a beam of laser light that impinges upon a reflector or mirror of microelectromechanical system (MEMS) device 218. MEMS device 218 is caused to oscillate and/or otherwise move in a desired pattern to cause the reflected laser beam emitted from laser 216 to sweep across a target 230 for capturing and decoding of the target 230. In one or more embodiments, memory 220 may contain values for a waveform with which MEMS device 218 is driven to cause the laser beam to sweep in a desired or predetermined pattern across target 230. The waveform stored in memory 220 may comprise digital values of the waveform for a given period of the waveform that may be converted to an analog signal via digital-to-analog converter (DAC) 222 and filtered with a reconstruction filter 224 to provide a smoother waveform to drive MEMS device 218. In one or more embodiments, the waveform stored in memory 220 may comprise a generally sinusoidal type waveform stored with 10 bits of quantization levels, and DAC 222 may comprise a 10 bit digital-to-analog converter operating at 100 kilosamples per second. Reconstruction filter 224 may comprise a resistor-capacitor type low pass filter capable of removing harmonics from the waveform above the fundamental frequency of the waveform stored in memory 220 to provide a generally smoother waveform to linear amplifier 226 that provides the driving signal to MEMS device 218.

In one or more embodiments, laser light is emitted from laser 216 to onto MEMS device 218 which in turn reflects the laser light onto target 230 in a pattern determined by the waveform stored in memory 222. The laser light is passed through window 228 and reflected off of target 230 back into window 228 of scanner system 100. Window 228 may provide some filtering of ambient light to assist in capturing light reflected off of target 230 without capturing ambient light or other optical noise that may be present in the environment in which scanner system 100 may be operated. Captured light may be further filtered via filter 232 and focused with lens 234 onto an optical detector 236 that may comprise, for example, a positive-intrinsic-negative (PIN) diode or the like. Light impinging on light detector may modulate a current that is amplified by amplifier 238, which may provide preamplification type functions and/or bandpass filter type functions to provide an electrical signal representative of the reflectance profile of light reflected off of target 230 onto optical detector 236. The output of amplifier 238 may then be provided to analog edge detector 240 for detecting edge transitions in electrical signal that correspond, for example, to the edges of bars or other symbols in target code 230. The output of analog edge detector 240 may then be provided to an input capture block 242 of processor 110 for decoding of the signal based on the output of analog edge detector 240. For example, the times between edges detected by analog edge detector 240 may correspond to the widths of the bars in the bar code of target 230, which in turn may correspond to data encoded in the bar code from which the data may be extracted. The resulting decoded signal may be stored, at least temporarily, in a non-volatile memory such as flash memory 246 and/or in a volatile type memory such as random access memory (RAM) 248. Furthermore, programs, software, and/or other data may be stored in flash memory 246 and/or RAM 248. A real time clock (RTC) 256 may be utilized to provide a time reference for processor 110 that may be utilized, for example, to time the interval between pulse edges detected by analog edge detector 240. In one or more embodiments, a coil resistance verification circuit 244 may be utilized to detect whether the coil of MEMS device 218 has failed and is an open circuit or a short circuit, or whether the coil resistance is within a normal range. In the event coil resistance verification circuit 244 detects an open circuit and/or a short circuit in the coil of MEMS device 218, processor 110 may shut off power to laser 216, for example for safety purposes, although the scope of the claimed subject matter is not limited in these respects.

In one or more embodiments, user interface 116 may comprise a button 250 that may be used by a user to actuate scanning of target 230 by scanner system 100. For example, in response to a user actuating button 250, processor 110 may turn on power to laser 216. A light such as light emitting diode (LED) 252 may be used to provide a visual indication to the user that scanner system 100 is operating and attempting to capture a target 230, and/or that the attempted capture of the target has failed and/or has been successful. Furthermore, user interface 116 may include a beeper 254 which may comprise a speaker or other device capable of generating and audible signal, which may likewise indicate to a user that the that scanner system 100 is operating and attempting to capture a target 230, and/or that the attempted capture of the target has failed and/or has been successful. Various combinations of light pulses, light flashed, solid illumination, and/or tones may be utilized to provide combinations of feedback to the user concerning the operation of scanner system 100 and/or the capturing of a target 230 by scanner system 100. Optionally, user interface 116 may include a display capable of providing more advanced and/or more detailed information to the user pertaining to the operation of scanner system 100 and/or the capturing of a target 230 by scanner system 100, although the scope of the claimed subject matter is not limited in this respect.

In one or more embodiments, communications/connectivity block 118 may comprise a first universal asynchronous receiver-transmitter (UART) 258 for handling serial type communications and/or a second UART 260. UART 258 may couple to a recommended standard-232 (RS-232) driver 262 to couple scanner system 100 to remote devices via an RS-232 type interface. UART 260 may likewise couple to remote devices using a serial type interface such as RS-232. UART 258 and/or UART 260 may further couple to one or more remote devices using various other types of communication interfaces such as Bluetooth, IEEE 802.11a/b/g/n, and so on. In one or more embodiments, RS 232 driver 262 may couple to a stereo jack such as a one-eighth inch stereo jack to couple scanner system 100 to one or more other devices during operation of scanner system 100, for example to implement a tethered mode of operation. In one or more embodiments, UART 260 may couple to a remote device or computer for performing debugging or the like type operations for scanner system 100. However, these are merely example types of communication systems and/or interfaces for scanner system 100, and the scope of the claimed subject matter is not limited in these respects.

In one or more embodiments, power management block 120 of scanner system 100 may include a power source such as battery 264, which may optionally include a serially connected fuse 266, to provide an operational voltage for scanner system 100. The battery voltage ($V_{BATTERY}$) of battery 264 may be provided to voltage regulator 268 to provide a regulated operational voltage to scanner system 100. One or more power switches 270 may be coupled to voltage regulator 268 for powering scanner system 100 on or off. Power switches 270 may provide a first voltage level ($V_{ANALOG}$) to power analog devices of scanner system 100 at an appropriate voltage for such analog circuits, and/or may provide a second voltage level ($V_{DIGITAL}$) to power digital devices of scanner system 100 at an appropriate voltage for such digital devices. The battery voltage from battery 264 may also be provided to an analog-to-digital converter (ADC) 274, which may comprise a 10 bit converter, to provide a voltage reference signal to processor 110 which may monitor the output voltage of battery 264, for example to indicate to the user that the charge on battery 264 is sufficient for operating scanner system 100, or to indicate to the user that the charge on battery 264 is low and should be recharged. Processor 110 may include a peripheral serial bus 276 to couple to an electrically erasable program read only memory (EEPROM) 272 capable of being utilized for storing data from one or more decoded targets for example in a batch mode, and/or for storing programs and/or data capable of being executed by processor 110, for example to control the operation of scanner system 100, although the scope of the claimed subject matter is not limited in these respects.

Figure 3:
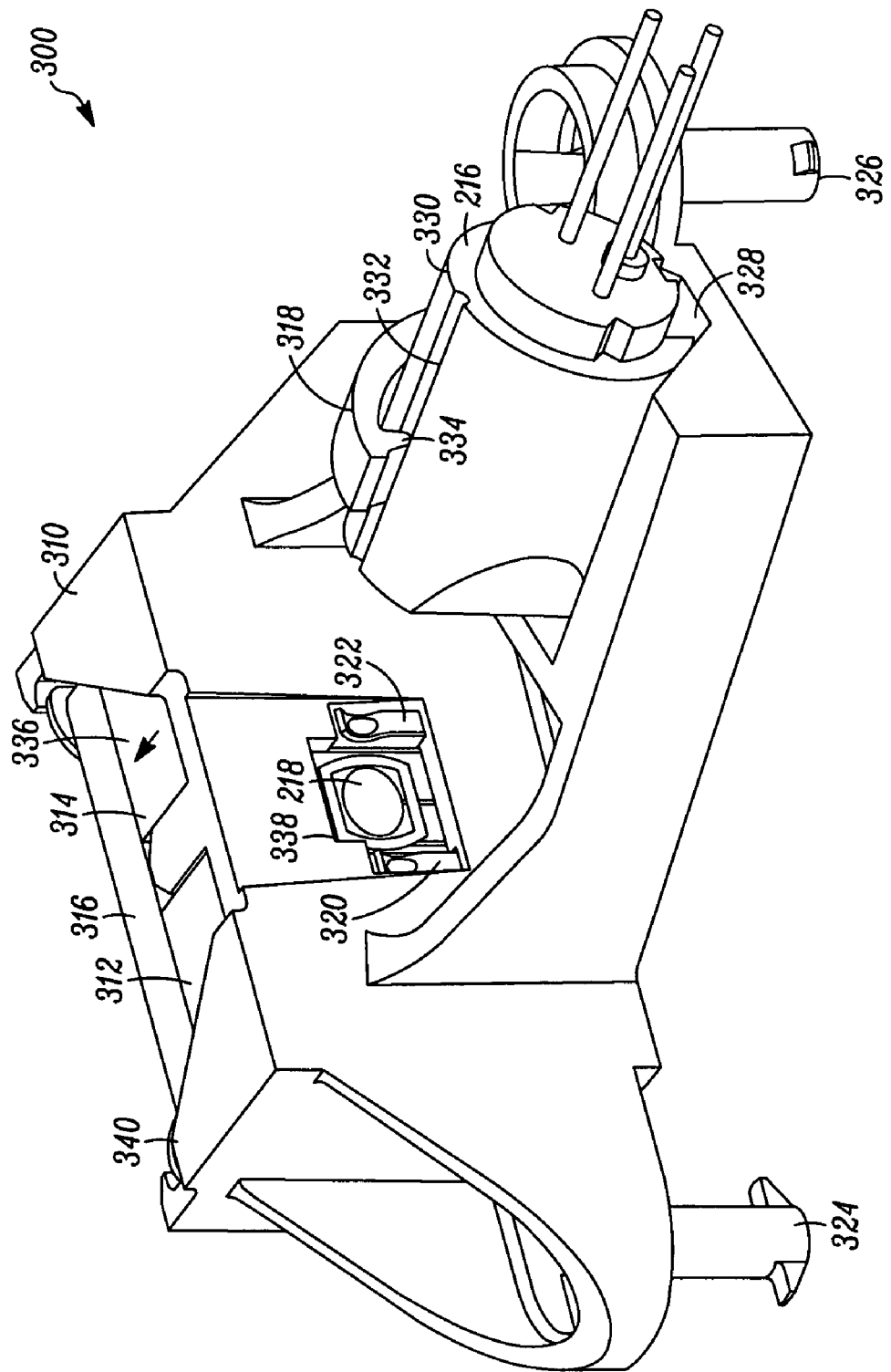
FIG. 3 is a perspective diagram of a scanning module of a scanner system in accordance with one or more embodiments.

Referring now to FIG. 3, a perspective diagram of a scanning module of a scanner system in accordance with one or more embodiments will be discussed. As shown in FIG. 3, scanning module 300 may comprise a frame 310 into which various components of scan line generator 112 may be disposed. In one or more embodiments, frame 310 may comprise a unitary structure comprising a molded plastic or the like. Frame 310 may comprise a first section 328 into which laser 216 may be inserted and fastened in place via snap arm 318. Laser 216 may comprise a transistor outline (TO) can type device inserted into a cylindrical cover or housing 330 having a slot or groove 332 into which a tab 334 of snap arm 318 may fit to hold laser 216 in place within first section 328. First section 328 may be further sized and/or shaped to contain laser 216 and restrict the lateral and/or longitudinal movement of laser 216 within first section 328. Such an arrangement of laser 216 and/or first section 328 may function to allow ease of insertion and/or removal of laser 216 into first section 328 of frame 310, and further to provide physical alignment of laser 216 such that a laser beam emitted from laser 216 may impinge upon MEMS device 218. Likewise, frame 310 may include second section 336 into which MEMS device 218 may be disposed and held within a proper alignment in second section 336 so that the laser beam emitted from laser 216 may impinge upon MEMS device 218 through window 338 formed in frame 310. Second section 336 may have a size and/or shape to allow magnet 312 and magnet 314 to be placed adjacent to MEMS device 218 and to further receive field plate 316 adjacent to and coupled with magnets 312 and 314. In addition, spring clip 340 may provide a bias force against field plate 316 to further secure field plate 316, magnets 312 and 314, and MEMS device 218 within second section 336. Contacts 320 and 322 may couple to the coil of MEMS device 218 to provide electrical contact with the coil and one or more contacts on a circuit board (not shown) onto which scanning module 300 may be placed within a housing of scanner system 100. Contacts 320 and 322 may be physically biased against corresponding contacts on MEMS device 218 to maintain physical and electrical contact with MEMS device 218 so that a mirror driving signal may be provided to MEMS device 218.

Such an arrangement of first section 328 and/or second section 336 may facilitate assembly of the components of scanning module 300 into frame 310 such that the components of scanning module 300 may be easily inserted into frame 310 without requiring additional alignment of the components such as laser 216 and/or MEMS device 218 after placement into frame 310. The tolerances with which frame 310 is manufactured may be sufficient to allow such assembly of scanning module 300 without requiring additional physical and/or electrical alignment of either laser 216 and/or scanning module 218. Frame 310 may further comprise one or more posts 324 and 326 having corresponding structures such as tabs to allow scanning module 300 to be attached to the circuit board (not shown) of scanner system 100 in a position with respect to window 228 as shown in FIG. 1 to allow for a range of motion for the sweep of the laser beam out of window 228 and to allow the laser beam reflected off of target 230 to enter back into the housing of scanner system 100 through window 228 to be detected by optical detector 236, although the scope of the claimed subject matter is not limited in these respects. It should be noted that although scanning module 300 of FIG. 3 pertains to a MEMS based scanning module for scanner system 100, scanning module 300 may be adapted to a MEMS based display module having a MEMS scanning rasterizer for generating a display from the laser light emitted from one or more lasers in a suitable arrangement to display an image projected onto a surface, in a display region such as in a head up display, and/or as an image projected onto a retina of a user, as a few of several examples, and the scope of the claimed subject matter is not limited in these respects.

Figure 4:
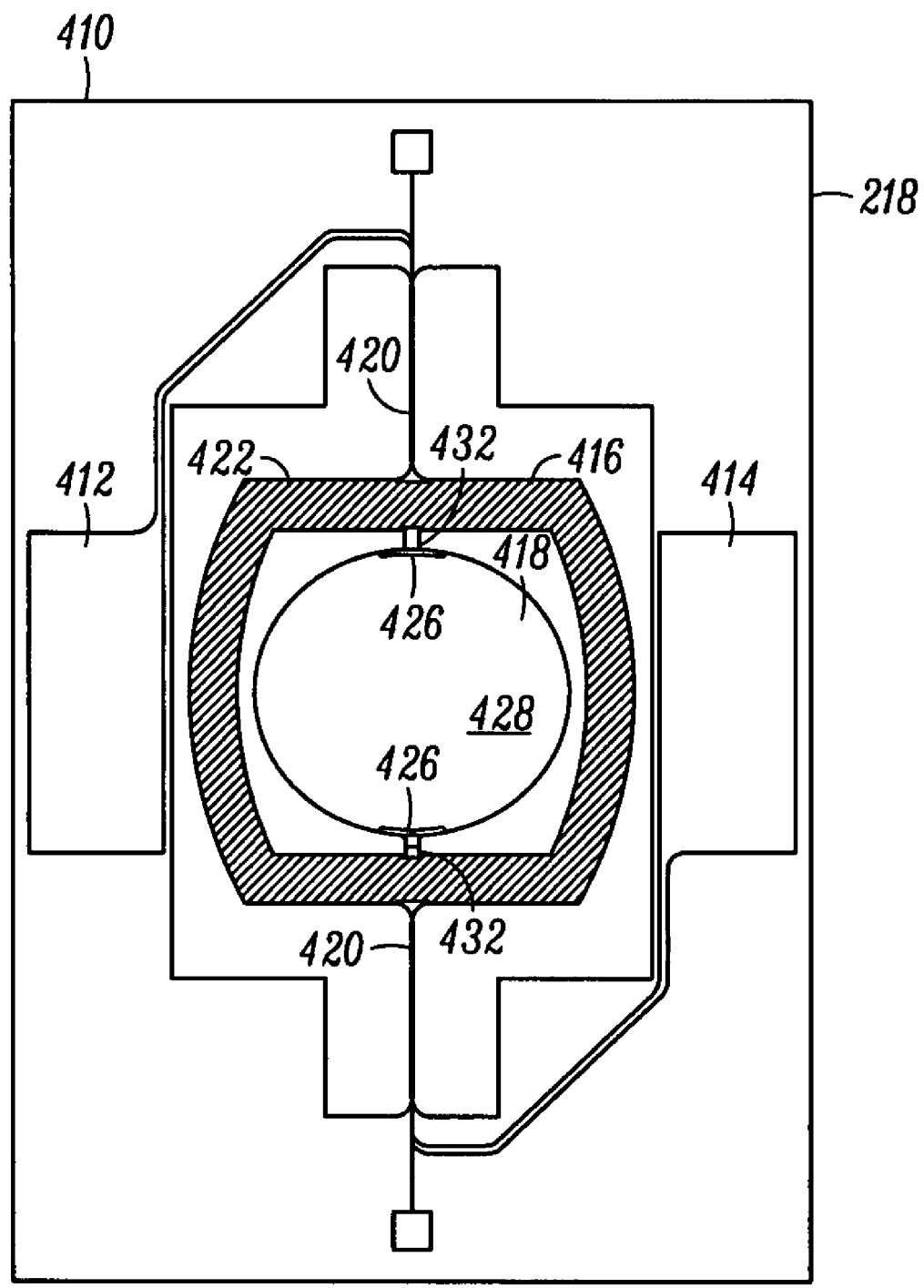
FIG. 4 is a top plan view of a MEMS device having a mirror for a scanner system in accordance with one or more embodiments.

Referring now to FIG. 4, a top plan view of a MEMS device having a mirror for a scanner system in accordance with one or more embodiments will be discussed. As shown in FIG. 4, MEMS device 218 may comprise a silicon frame 410 from which structures of MEMS device 218 may be formed, for example via etching and/or photolithography to produced the desired structures. In one or more embodiments, frame 410 may comprise a unitary structure including contacts 412 and 414 that comprise the ends of a coil 422 disposed on coil frame 416. Coil frame 416 may be supported by suspension arms 420 disposed at opposing ends of coil frame 416 along an axis of rotation of coil frame 416. Suspension arms 420 may comprise a continuous structure that extends into the interior region of coil frame 416 to couple to mirror platform 418 via connection points 432. Thus, in one or more embodiments, frame 410, coil frame 416, suspension arms 420, connection points 432, and mirror platform 418 may comprise a single piece of silicon or similar material. In one or more embodiments, coil 422 may be formed on coil frame 416 for example via deposition of a metal with a higher conductivity such as gold, aluminum, or copper. In one embodiment, coil 422 may comprise gold, although the scope of the claimed subject matter is not limited in this respect. Contact 412 may comprise a first end of coil 422, and contact 414 may comprise a second end of coil 422. In one or more embodiments, a mirror 428 may be formed as a thing metal firm disposed on mirror platform 418 via deposition of a metal with higher optical reflectance properties, for example aluminum. Mirror 428 may be capable of reflecting a beam of laser light impinging on its surface in a direction controlled by movement of coil frame 416 and mirror platform 418 as discussed, below.

In one or more embodiments, coil 422 may be driven with a signal to cause coil frame 416 to move and/or oscillate in response to the signal in the presence of a magnetic field to generate electromotive force. The magnetic field may be provided by magnets 312 and 314 of FIG. 3 disposed adjacent to frame 410 as shown for example in FIG. 3. Since mirror platform 418 is coupled to coil frame 416 via connection points 432, mirror platform 418 moves along with coil frame 416. Magnet 312 may be disposed with its polarity aligned in a first direction normal to the plane of coil 422, and magnet 314 may be disposed with its polarity disposed in a second direction normal to the plane of coil 422 such that the polarity of magnet 312 is opposite to the polarity of magnet 314. Such an arrangement of coil 422 and magnets 312 and 314 causes coil frame 416 and mirror platform to rotate about an axis generally aligned with suspension arms 420. The rotation of suspension arms 420 imparts a twist in the structure of suspension arms 420 to accommodate the movement of coil frame 416 and mirror platform 418 along the axis generally aligned with suspension arms 420. In order to minimize warping of mirror 428 which may adversely affect the laser beam reflected off of mirror 428 and thereby interfere with the scanning of target 230, for example where such warping may be the result of residual stress between the metal file of mirror 428 and the silicon material of mirror platform 418, mirror platform 418 may be connected to coil frame 416 at connection points 432 that are disposed collinearly with suspension arms 420, which may be generally aligned with the axis of rotation of coil frame 416 and/or mirror platform 418. Such an arrangement may reduce warping of mirror 428 since coil frame 416 may be minimally warped as such locations corresponding where coil frame 416 couples to suspension arms 420. In order to isolate mirror platform 418 from the twist of suspension arms 420 and to maintain the planar flatness of mirror platform 418, one or more flexible members 426 may be disposed on mirror platform 418 adjacent to connection points 432. As suspension arms 420 in response to movement of coil frame 416 when coil 422 is driven with a driving signal in the presence of a magnetic field, flexible members 426 prevent and/or reduce such twist from being imparted to mirror platform 418, thereby maintaining the relative flatness of mirror platform 418 and mirror 428.

Figure 5:
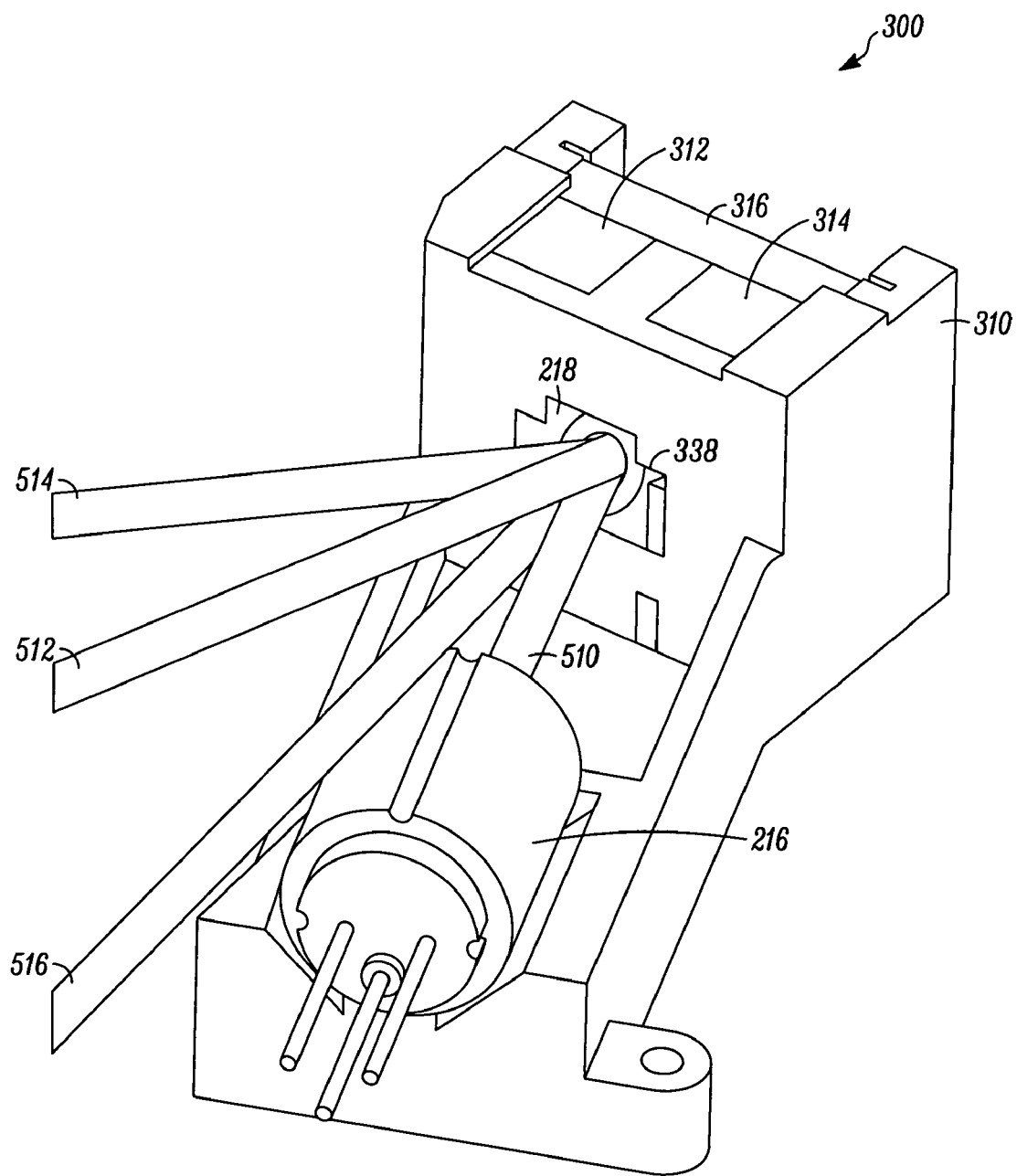
FIG. 5 is a perspective diagram of the scanning module of FIG. 3 further showing the scanning action of a reflected laser beam in accordance with one or more embodiments.

Referring now to FIG. 5, a perspective diagram of the scanning module of FIG. 3 further showing the scanning action of a reflected laser beam in accordance with one or more embodiments will be discussed. As shown in FIG. 5, MEMS device 218 of scanning module 300 may be driven to operate in a non-resonant mode. In one or more embodiments, laser 216 may emit a beam of laser light 510 that impinges upon the mirror 428 of MEMS device 218 to result in a reflected beam 512 that may be pointed in a direction based on the direction at which the mirror 428 of MEMS device 218 is pointed in response to a drive signal. A drive signal provided to MEMS device 218 may cause the reflected beam 512 to be swept between a first full deflection direction 514 to a second full deflection direction 516 to define a maximum field of view (FOV) at which MEMS device 218 may operate. In one embodiment, such a maximum field of view my comprise an angle between first direction 514 to second direction 516 of about 50 degrees, although the scope of the claimed subject matter is not limited in this respect.

By driving MEMS device 218 with in a mode that does not depend on the resonance of MEMS device 218, MEMS device 218 may be driven to oscillate at a desired frequency that may be a different frequency than the resonant frequency of MEMS device 218. For example, a typical MEMS device 218 may have a resonant frequency ranging from about 200 Hertz up to about 1000 Hertz. Thus, to operate such a MEMS device 218 in a resonant mode may require the drive signal and the beam sweep rate to be at or near the resonant frequency. Such a relatively higher rate of sweep may likewise require the target decoding electronics to operate at a faster rate than may be needed to actually decode the target. Thus, in one or more embodiments, MEMS device 218 may be non-resonantly driven at a frequency that is lower than the resonant frequency of MEMS device 218, while optionally being operated at a frequency that is sufficiently high such that any inadvertent hand movement of the user of scanning system 100 will not interfere and/or adversely affect the ability of scanning system 100 to successfully decode target codes. In one or more embodiments, MEMS device 218 may be non-resonantly driven at a frequency of about 50 Hertz, although the scope of the claimed subject matter is not limited in this respect.

In one or more embodiments, by driving MEMS device 218 in a non-resonant mode, the reflected beam 512 may be steered within a sweep range that includes any portion of a full sweep range between first direction 514 and second direction 516. In general, a sweep range may also refer to a sweep scan or a scan angle. Likewise, MEMS device 218 may be driven at a frequency that is capable of adapting to the size of target 230 and/or the size and/or spacing of the symbols of target 230, for example to slow down the rate of scanning if the symbols of target 230 are spaced more closely together, or to increase the rate of scanning if the symbols of target 230 are spaced more farther apart. Likewise, MEMS device 218 may be driven non-resonantly to direct the sweep range in a direction that may be off axis from the direction at which scanning system 100 is pointing, and/or to optimize the relative spot size of the beam reflected off of target 230 and impinging upon optical detector 236. Furthermore, in one or more embodiments, by driving MEMS device 218 in a non-resonant mode, the reflected beam 512 may be directed to a stationary position within the full sweep range including or between first direction 514 and second direction 516, for example to provide scanning system 100 with a function similar to a laser pointer. Details of such embodiments in which MEMS device 218 may be operated in a non-resonant mode are discussed further, below.

Figure 6:
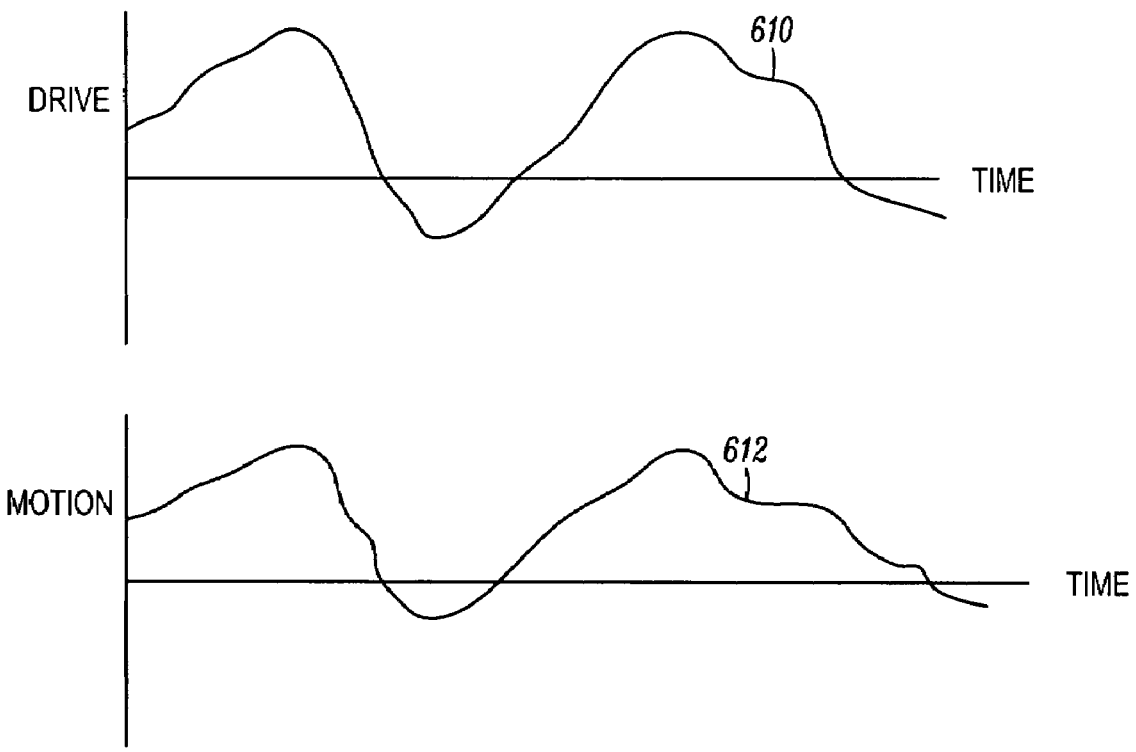
FIG. 6 is a graph of a drive signal with respect to time and a resulting motion of mirror of a scanner system in accordance with one or more embodiments.

Referring now to FIG. 6, a graph of a drive signal with respect to time and a resulting motion of mirror 428 of a scanner system in accordance with one or more embodiments will be discussed. As shown in FIG. 6, MEMS device 218, in particular mirror 428 of mirror platform 418, and/or coil frame 416 with coil 422, may be non-resonantly driven with an arbitrary drive signal as shown by plot 610. Typically, MEMS device 218 would have a tendency to respond resonantly and the response of MEMS device 218 would be to oscillate at or near its resonant frequency. However, by driving MEMS device 218 in an non-resonant mode, the tendency of MEMS device 218 to oscillate at or near its resonant frequency may be removed and/or diminished, such that MEMS device 218 may respond in a manner as shown by plot 612 that substantially follows the drive signal of plot 610 with which MEMS device 218 is driven, wherein plot 612 may be at some phase offset from plot 610. In general, MEMS device 218 may be actuated by a drive signal having significant frequency content away from the natural resonance of MEMS device 218. The motion of MEMS device 218 may be represented by a waveform that is similar to the drive signal, which may have some phase offset. The trajectory of mirror 428 of MEMS device 218 thus may be similar to the drive waveform and/or at least predictable. A calibration procedure may be utilized to more precisely compute the orientation of mirror 428 at any point in time. When changes in the response of MEMS device 218 due to environmental factors is known, such a computation of the orientation of mirror 428 may be altered accordingly. In a barcode reading application, the knowledge of the orientation of mirror 428 with respect to time may be used to infer information about the barcode target, to gate the processing of incoming barcode data, and/or to control the laser 216 to be active only during certain times of interest. Thus, with knowledge of the initial position of MEMS device 218, for example as determined via a calibration procedure, MEMS device 218 may be moved to point in a known direction, and as a result the reflected laser beam 512 may be directed into a desired position in a direction that is known by scanning system 100 in a manner and/or at a frequency based at least in part on the characteristics of the drive signal, although the scope of the claimed subject matter is not limited in this respect.

Figure 7:
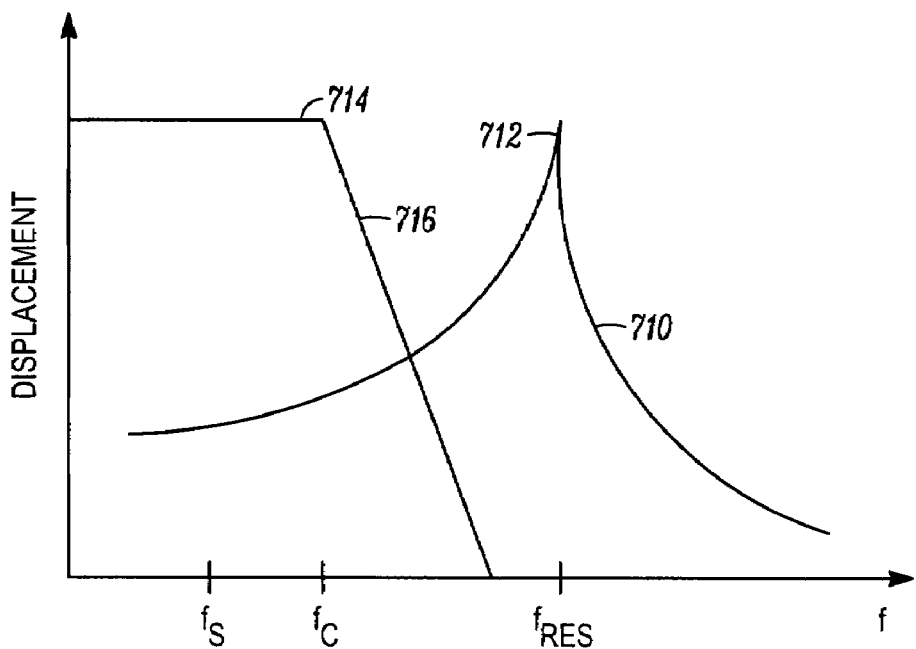
FIG. 7 is a graph of the resonant response of a MEMS device and the response of a low pass filter utilized to drive the MEMS device in a non-resonant mode of operation in accordance with one or more embodiments.

Referring now to FIG. 7, a graph of the resonant response of a MEMS device and the response of a low pass filter utilized to drive the MEMS device in a non-resonant mode of operation in accordance with one or more embodiments will be discussed. As shown in FIG. 7, MEMS device 218 may have a resonant frequency response as shown by plot 710. The resonance characteristic of MEMS device 218 may be a function of the mass of coil frame 416 and mirror platform 418, and the resistance to twisting forces exhibited by suspension arms 420 which may generally correspond to a spring constant. MEMS device 218 may exhibit a maximum displacement 712 in response to a drive signal and/or drive signal component at the resonant frequency ($f_{RES}$) for a given amplitude of the drive signal. As discussed herein, a typical resonant frequency for MEMS device 218 may be about 200 Hertz or higher. In one or more embodiments, MEMS device 218 may be driven non-resonantly by using a low pass filter to filter harmonic components greater than the frequency of the selected drive frequency ($f_S$) to eliminate and/or sufficiently reduce the driving of MEMS device 218 with a drive signal and/or a component of the drive signal at or near the resonant frequency of MEMS device 218. In one or more embodiments, the response of such a non-resonant drive filter such as shown by plot 714 may have a cutoff frequency ($f_C$) sufficiently lower than the resonant frequency of MEMS device 218 to avoid driving MEMS device 218 resonantly. Furthermore, the non-resonant drive filter may have a roll-off characteristic 716 selected to have sufficient attenuation at the resonant frequency of MEMS device 218 to avoid a resonant response of MEMS device 218. The non-resonant drive filter may be designed to have a sufficient order and/or filter type such as a Chebyshev type filter, a Bessel type filter, a Butterworth filter, a Gaussian type filter, an elliptical type filter, and so on, having a selected roll-off characteristic 716, measured in decibels per octave or decade, above the cutoff frequency to achieve a sufficient amount of attenuation at or near the resonant frequency of MEMS device 218 to avoid driving MEMS device 218 at resonance. For example, a Chebyshev type filter may be utilized to drive MEMS device 218 non-resonantly since Chebyshev type filters have a generally steeper roll-off characteristic 716. In one or more embodiments, such a non-resonant drive filter response 714 may be realized at least in part by filter 224 as shown in FIG. 2 as an analog type filter. In one or more alternative embodiments, a non-resonant drive filter response 714 may be realized at least in part by a digital filter implemented by processor 110. In yet other alternative embodiments, MEMS drive waveforms stored in memory 220 may be prefiltered with an appropriate non-resonant drive filter response such that MEMS drive waveform values stored in memory 220 are valued to represent a filtered non-resonant drive waveform. Furthermore, although FIG. 7 shows a low pass filter response 714 for driving MEMS device 218 non-resonantly, other types of filter responses may likewise be utilized. For example, a notch filter and/or band rejection filter response could be applied where the notch frequency is at or near the resonant frequency of MEMS device 218, to allow MEMS device 218 to be driven with a drive signal having frequency content below and/or above the resonant frequency, but frequency content at or near the resonant frequency is sufficiently attenuated and/or eliminated to avoid driving MEMS device 218 resonantly. Similarly, a high pass filter response may be applied to drive MEMS device 218 with a drive signal having frequency content above the resonant frequency of MEMS device 218 to drive MEMS device 218 non-resonantly. However, these are merely example implementations of a non-resonant drive filter, and the scope of the claimed subject matter is not limited in these respects.

Referring now to FIGS. 8A and 8B, diagrams illustrating the ability to direct a mirror of a scanner system to a sub-portion of a field of view of the scanner to scan a target located away from a user pointing axis in accordance with one or more embodiments will be discussed. As shown in FIG. 8A, a user operating scanner system 100 may direct a user pointing axis 810 in a direction that is not directly pointing at target 230. Thus, a field of view (FOV) 812 may defined by two full sweep directions of the laser beam by pointing mirror 428 from direction 514 to direction 516 such that target 230 may be disposed within field of view 812 but located somewhere off of pointing axis 810. Since MEMS device 210 may respond to a direct current (DC) drive signal, the drive signal may include a DC component to enable the field of view 810 to be directed away from user pointing axis 810 toward the location of target 230 as shown in FIG. 8B. Furthermore, the sweep range of the laser beam may be adaptively directed to sweep in a field of view 818 that more closely focuses on target 230 by sweeping mirror 429 between direction 814 and direction 816. Thus, field of view 818 may comprise a sub-portion of filed of view 812 by driving MEMS device 218 with an appropriate, non-resonant drive signal. Such an adaptive field of view 818 may enhance the readability of target 230 by scanner system 100, and/or to reduce the read time. In one or more embodiments, the drive signal may comprise just a DC valued signal to cause mirror 428 to point in a single, constant direction offset from pointing axis 810 to allow scanner system 100 to implement a laser pointer type function which may be optionally utilized in conjunction with the operation of scanner system 100 to read targets 230, for example to provide feedback to a user, to indicate an edge of target 230, and so on. Further details of the adaptive operation of scanning system 100 by driving MEMS device 218 non-resonantly is described in further detail, below, and the scope of the claimed subject matter is not limited in these respects.

Figure 9:
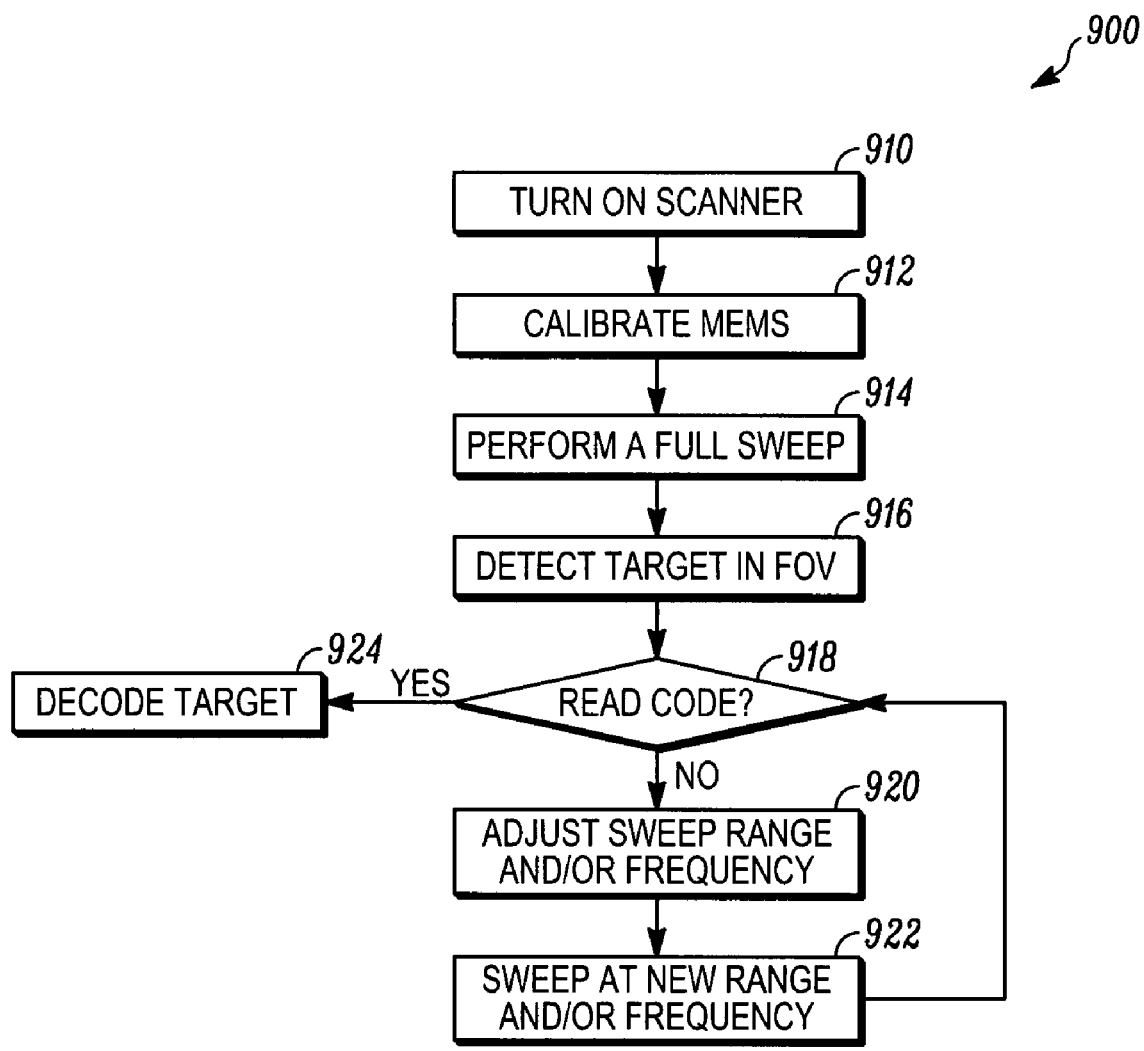
FIG. 9 is a flow diagram of a method to adjust a sweep range and/or a sweep frequency of a scanner system operating in a non-resonant mode in accordance with one or more embodiments.

Referring now to FIG. 9, a flow diagram of a method to adjust a sweep range and/or a sweep frequency of a scanner system operating in a non-resonant mode in accordance with one or more embodiments will be discussed. FIG. 9 shows one particular order of blocks 910 through 924, however other orders may also be utilized, with more or fewer blocks than shown in FIG. 9, and the scope of the claimed subject matter is not limited in these respects. As shown in FIG. 9, scanner system 100 may be turned on at block 910 to allow a user to start reading targets 230 such as bar codes. MEMS device 218 may be calibrated at block 912, for example to determine the initial position of mirror 428, and/or to point mirror 428 in a selected position, which may be a natural rest position or a position away from the rest position of mirror 428, for example by providing a DC offset signal to mirror 428. When a user activates scanner system 100 to read target 230, for example by actuating button 250, scanner system 100 may initially perform a full sweep at block 914, for example by driving MEMS device 218 with a signal that directs mirror between full sweep direction 514 to full sweep direction 516 to scan a target 230 that may be disposed within a full sweep field of view 812. Scanner system 100 may detect if there is a target 230 located in field of view 812 at block 916, for example by recognizing a reflectance profile indicative of target 230 resulting from reflected light entering scanner system 100 via window 228 and impinging on optical detector 236.

If a target 230 is detected at block 916, a determination may be made at block 918 regarding the readability of target 230, for example whether a detected bar code is able to be decoded without error. In the event target 230 is readable from the initial full sweep, target 230 may be decoded by scanner system 100 at block 924. However, if target 230 cannot be fully read or at least partially read, or one or more errors are detected, and/or target 230 is detected to be located somewhere away from user point axis 810, scanner system 100 may adjust one or more operating parameters to attempt a better read of target 230. For example, the sweep range of mirror 428 may be adjusted at block 920 to direct field of view 812 from user pointing axis 810 to be more directed toward target 230 to result in field of view 818 for example via a DC offset in the drive signal, and/or to cause target 230 to occupy a larger percentage of field of view 818 by limiting the amplitude of the drive signal to direct the laser beam between direction 814 and direction 816. Further details of such directing field of view 812 from user point axis 810 to an off axis target 230, that is beam steering, are discussed with respect to FIG. 10, below. Furthermore, the frequency of the drive signal may be adjusted either higher or lower to result in a faster sweep or slower sweep, by adjusting the frequency of the drive signal, separately or in conjunction with adjusting the sweep range, to obtain a better read of target 230. Thus, the updated drive signal may cause the laser beam to sweep at the new range and/or frequency at block 922. Such adjustments of the sweep range and/or sweep frequency may occur iteratively until a determination is made at block 918 that target 230 may be read, and target 230 may be decoded at block 924.

In one or more embodiments, such frequency adjustment made at block 920 may be utilized to provide a velocity correction in the sweep of the laser beam, and or a tailored velocity as a function the position of mirror 428, for example to provide a constant velocity of the beam spot across all or nearly all of target 230. As discussed, above, the position of mirror 428 as a function of time may be determined and known when driving MEMS device 428 non-resonantly. Knowing the position of mirror 428 as a function of time also means the velocity of mirror 428 is likewise known. Thus, the velocity of mirror 428 can be tailored and/or optimized to enhance readability of target 230. For example, the known position of mirror 428 allows a determination to be made regarding the location of target to within a sub region of the field of view 812 which may be field of view 818. The velocity of the sweep of the laser beam is able to be altered within that field of view 818 to optimize the readability within that field of view 818. An example of such optimization may comprise minimizing velocity deviation from a constant value. Knowledge of the type of target 230 being read, such as the module width of a bar code, could be used to further optimize the velocity by selecting a frequency of the drive signal adapted to the module width of the bar code to cause the beam to sweep across target at the selected scan frequency although the scope of the claimed subject matter is not limited in these respects.

In one or more embodiments, the scan frequency can be made variable from DC to somewhat above the natural resonant frequency of MEMS device 218, and the drive waveform can be composed of several frequency components. The scan frequency can be adaptively changed to optimize readability of target 230 and/or the time to complete a read of target 230 by scanning system 100. Likewise, startup and/or shutdown waveforms used to drive MEMS device 218 may be selected to result in a desired motion and/or behavior of mirror 428. Initially actuating mirror 428 away from its rest position may subject mirror 428 to impulsive forces that cause transient trajectory perturbations such as oscillations of mirror 428 at its resonant frequency that decay according to a damping characteristic of MEMS device 218. Such perturbations may be minimized and/or reduced by controlling the frequency content of the drive signal. In some embodiments, if the drive signal is an analog waveform, a low-pass filter that attenuates frequency content near the resonant frequency of MEMS device 218 may be utilized. In some embodiments, if the drive signal is generated digitally, the drive levels computed by processor 110 and/or read from memory 220 and input to DAC 222 may be pre-filtered, that is representative of a signal that contains a minimal amount of frequency components that would impulsively excite the MEMS device 218. The relevant startup parameters and/or filter characteristics active at the startup of scanner system 100 may be selected to reduce and/or minimize the time that elapses between a command to read a target 230 and the time when trajectory perturbations have decayed to a small enough amplitude to accurately read target 230. Similarly, the drive waveform applied to bring mirror 428 back to the off/rest position may be selected such that MEMS device 218 is able to accept another startup command with reduced and/or minimal trajectory perturbations.

In addition, the drive waveform applied to MEMS device 218 to result in a desired movement of mirror 428 may be adaptively altered at block 920 based at least in part on information received from target 230. The drive signal frequency, amplitude, shape, amplitudes and/or phases of frequency components, and/or any filter characteristics may be changed to enhance and/or optimize readability of target 230, and/or reduce time to read target 230, although the scope of the claimed subject matter is not limited in these respects.

Figure 10:
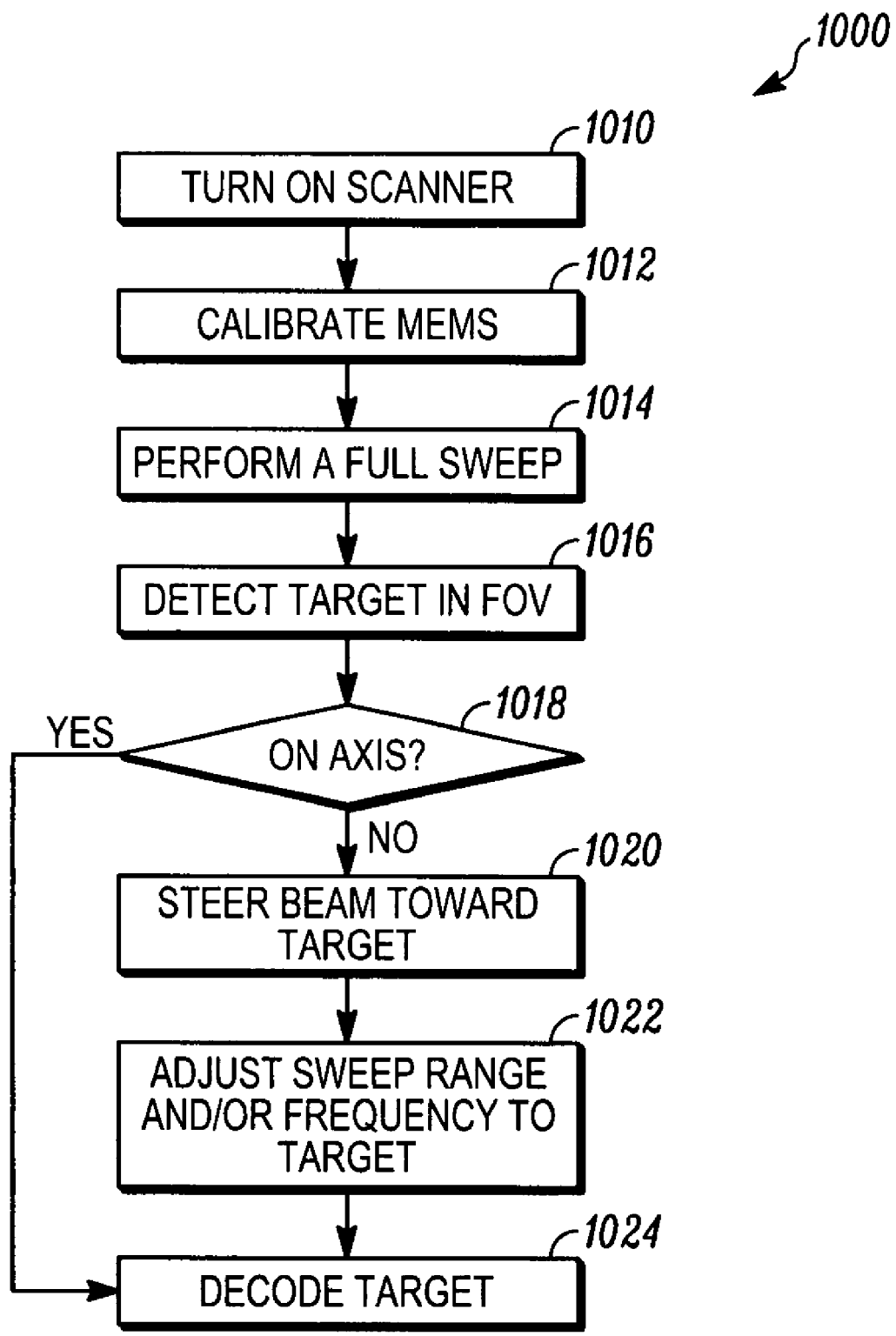
FIG. 10 is a flow diagram of a method to steer a scanning beam toward a target that may be disposed off axis in a scanner system operating in a non-resonant mode in accordance with one or more embodiments.

Referring now to FIG. 10, a flow diagram of a method to steer a scanning beam toward a target that may be disposed off axis in a scanner system operating in a non-resonant mode in accordance with one or more embodiments will be discussed. FIG. 10 shows one particular order of blocks 1010 through 1024, however other orders may also be utilized, with more or fewer blocks than shown in FIG. 10, and the scope of the claimed subject matter is not limited in these respects. As shown in FIG. 10, scanner system 100 may be turned on at block 1010 to allow a user to start reading targets 230 such as bar codes. MEMS device 218 may be calibrated at block 1012, for example to determine the initial position of mirror 428, and/or to point mirror 428 in a selected position, which may be a natural rest position or a position away from the rest position of mirror 428, for example by providing a DC offset signal to mirror 428. When a user activates scanner system 100 to read target 230, for example by actuating button 250, scanner system 100 may initially perform a full sweep at block 1014, for example by driving MEMS device 218 with a signal that directs mirror between full sweep direction 514 to full sweep direction 516 to scan a target 230 that may be disposed within a full sweep field of view 812. Scanner system 100 may detect if there is a target 230 located in field of view 812 at block 1016, for example by recognizing a reflectance profile indicative of target 230 resulting from reflected light entering scanner system 100 via window 228 and impinging on optical detector 236.

In the event target 230 is detected to be disposed within field of view 812, a determination may be made at decision block 1018 whether the target 230 is located off axis from user pointing axis 810. If target is not determined to be off axis, or not substantially off axis, from user pointing axis, method 1000 may continue at block 1024 and target 230 may be decoded. If target is determined to be off axis, the laser beam may be steered toward target 230 by operating mirror 428 at a variable scanning angle. This may be accomplished for example by providing a DC offset to the drive signal applied to MEMS device 428, by varying and/or limiting the amplitude of the drive signal, and/or varying the sweep frequency so that the laser beam emitted from scanning system 100 falls between direction 814 and direction 816 to result in an updated field of view 818 which may comprise a subportion of field of view 812 and which may be generally directed to and/or generally symmetric about target 230. Thus, in addition to steering the laser beam towards target 230, scanning system 100 may also adjust the sweep range and/or frequency at block 1022 to adapt to the size, distance, and/or type of target to optimize and/or increase the readability of target 230, and to maximize and/or optimize the time spent scanning the light beam over target 230 and/or to reduce and/or optimize the time to complete a read of target 230, although the scope of the claimed subject matter is not limited in these respects.

Figure 11:
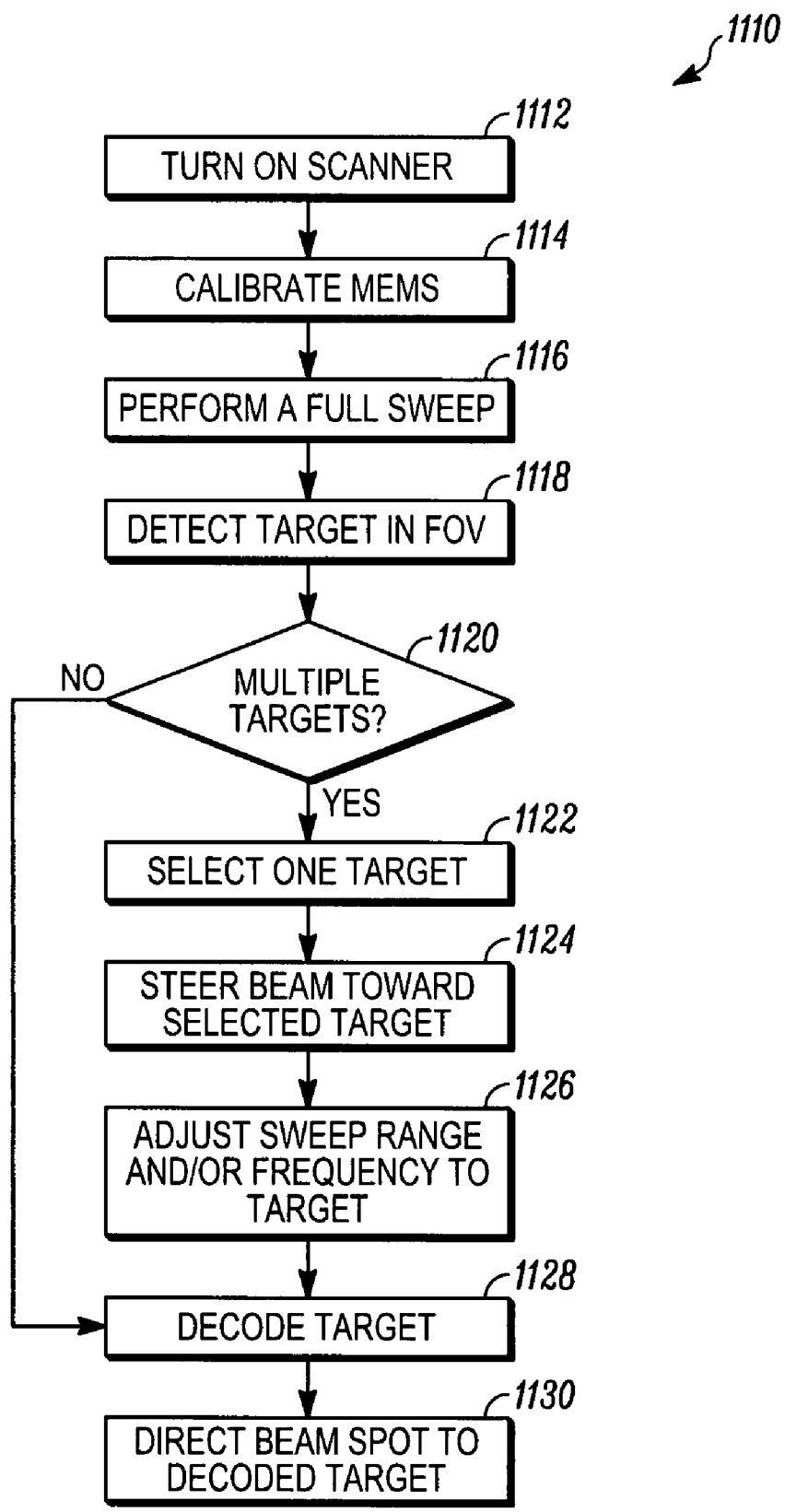
FIG. 11 is a flow diagram of a method to scan a selected target in the presence of multiple targets with a scanner system operating in a non-resonant mode in accordance with one or more embodiments.

Referring now to FIG. 11, a flow diagram of a method to scan a selected target in the presence of multiple targets with a scanner system operating in a non-resonant mode in accordance with one or more embodiments will be discussed. FIG. 11 shows one particular order of blocks 1112 through 1130, however other orders may also be utilized, with more or fewer blocks than shown in FIG. 11, and the scope of the claimed subject matter is not limited in these respects. As shown in FIG. 11, scanner system 100 may be turned on at block 1112 to allow a user to start reading targets 230 such as bar codes. MEMS device 218 may be calibrated at block 1114, for example to determine the initial position of mirror 428, and/or to point mirror 428 in a selected position, which may be a natural rest position or a position away from the rest position of mirror 428, for example by providing a DC offset signal to mirror 428. When a user activates scanner system 100 to read target 230, for example by actuating button 250, scanner system 100 may initially perform a full sweep at block 1116, for example by driving MEMS device 218 with a signal that directs mirror between full sweep direction 514 to full sweep direction 516 to scan a target 230 that may be disposed within a full sweep field of view 812. Scanner system 100 may detect if there is a target 230 located in field of view 812 at block 1118, for example by recognizing a reflectance profile indicative of target 230 resulting from reflected light entering scanner system 100 via window 228 and impinging on optical detector 236.

If at least one target is detected within field of view 812 of scanner system 100, a determination may be made at decision block 1120 whether there are multiple targets 230 disposed within field of view 812. In the event that multiple targets 230 are not detected within field of view 812, but a single target 230 is detected, target 230 may be decoded at block 1128 for example in a manner as shown in and described with respect to FIG. 9 or FIG. 10. In the event that multiple targets 230 are detected within field of view 812, one of the multiple targets 230 may be selected at block 1122 for scanning and decoding. The laser beam may be steered at block 1124 toward the particular target 230 selected at block 1122, and/or the sweep range and/or scanning frequency may be adjusted at block 1126 for example as shown in and described with respect to FIG. 9 or FIG. 10. The selected target 230 may then be decoded at block 1128 for example in a manner as shown in and described with respect to FIG. 9 or 10. In one or more embodiments, the laser beam may be directed toward the target 230 that was just decoded at block 1128 to indicate to the user which one or ones of the multiple targets 230 were decoded. For example, the drive signal provided to MEMS device 218 may be simply a DC signal to direct mirror 428 and thus the beam to the just decoded target 230. Optionally, the beam may be stationary on and/or proximate to the just decoded target 230 to provide a beam spot on target 230 at least temporarily so that scanner system 100 functions as a laser pointer. In one or more embodiments, laser 216 may modulated on and off while providing the beam spot so that the laser beam flashes to a brief period of time, for example to capture the attention of the user. In one or more embodiments, such beam spot directing and/or flashing may optionally occur prior to the scanning and decoding of the target instead of and/or in addition to occurring post decoding. Furthermore, in one or more embodiments method 1110 may repeat in series from blocks 1122 to blocks 1130 for additional ones of the multiple targets detected at decision block 1120, for example until all or nearly all of the multiple targets 230 in field of view 812 are scanned and decoded, although the scope of the claimed subject matter is not limited in these respects.

Figure 12:
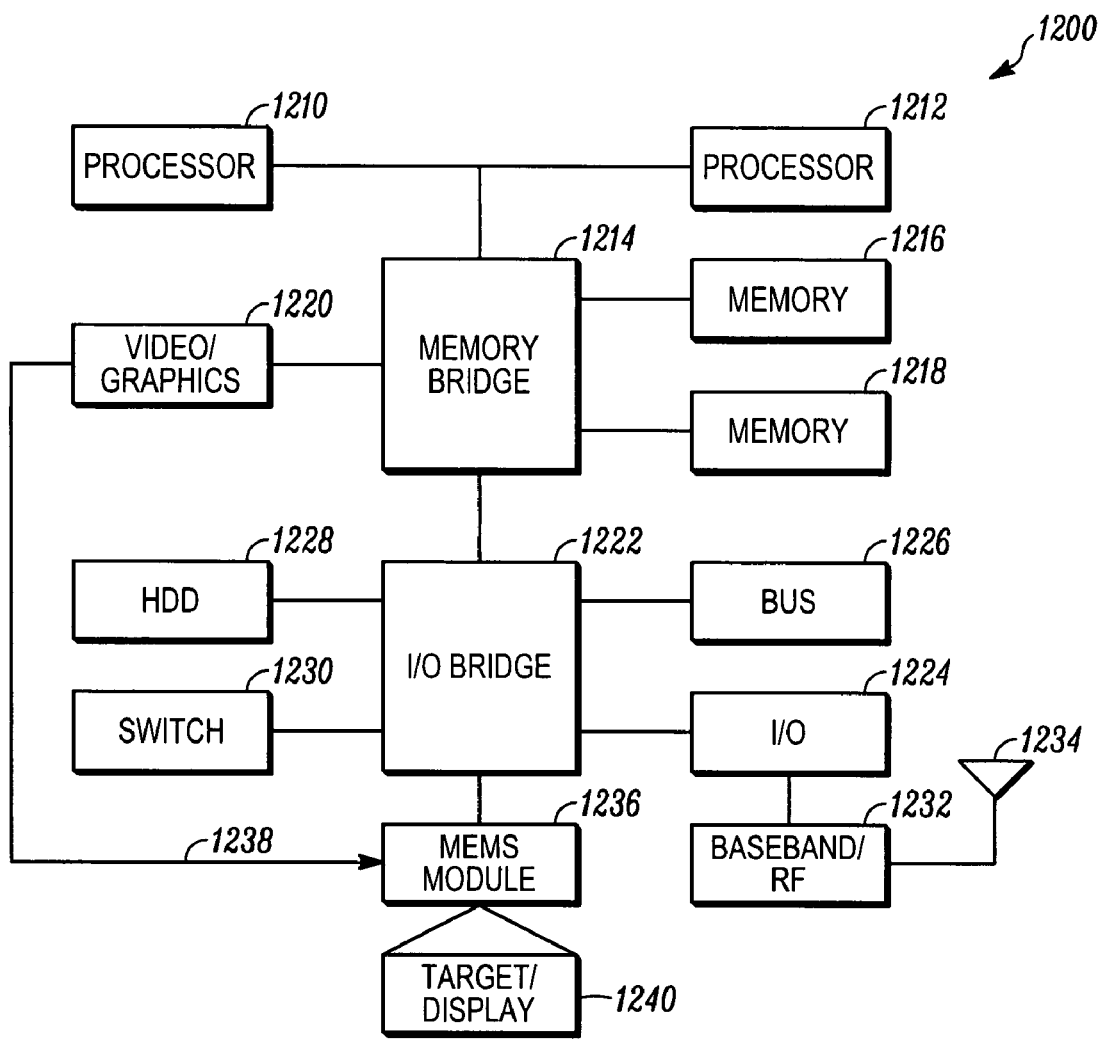
FIG. 12 is a block diagram of an information handling system capable of utilizing a MEMS device operating in a non-resonant mode in accordance with one or more embodiments.

Referring now to FIG. 12, a block diagram of an information handling system capable of utilizing MEMS device operating in a non-resonant mode in accordance with one or more embodiments will be discussed. Information handling system 1200 of FIG. 12 may tangibly embody scanning system 1200 as shown in and described with respect to FIG. 1. Although information handling system 1200 represents one example of several types of computing platforms, information handling system 1200 may include more or fewer elements and/or different arrangements of elements than shown in FIG. 12, and the scope of the claimed subject matter is not limited in these respects.

Information handling system 1200 may comprise one or more processors such as processor 1210 and/or processor 1212, which may comprise one or more processing cores. One or more of processor 1210 and/or processor 1212 may couple to one or more memories 1216 and/or 1218 via memory bridge 1214, which may be disposed external to processors 1210 and/or 1212, or alternatively at least partially disposed within one or more of processors 1210 and/or 1212. Memory 1216 and/or memory 1218 may comprise various types of semiconductor based memory, for example volatile type memory and/or non-volatile type memory. Memory bridge 1214 may couple to a video/graphics system 1220 to drive a display device, which may comprise MEMS module 1236, coupled to information handling system 1200.

Information handling system 1200 may further comprise input/output (I/O) bridge 1222 to couple to various types of I/O systems. I/O system 1224 may comprise, for example, a universal serial bus (USB) type system, an IEEE 1394 type system, or the like, to couple one or more peripheral devices to information handling system 1200. Bus system 1226 may comprise one or more bus systems such as a peripheral component interconnect (PCI) express type bus or the like, to connect one or more peripheral devices to information handling system 1200. A hard disk drive (HDD) controller system 1228 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 1230 may be utilized to couple one or more switched devices to I/O bridge 1222, for example Gigabit Ethernet type devices or the like. Furthermore, as shown in FIG. 12, information handling system 1200 may include a baseband and radio-frequency (RF) block 1232 comprising a base band processor and/or RF circuits and devices for wireless communication with other wireless communication devices and/or via wireless networks via antenna 1234, although the scope of the claimed subject matter is not limited in these respects.

In one or more embodiments, information handling system 1200 may include a MEMS module 1236 that may correspond to scanning module 300 of FIG. 3 and which may include any one or more components of scanning system 100 such as processor 110, scan line generator 112, target bar code imager 114, user interface 116, communications/connectivity block 118, and/or power management block 120. In one or more embodiments, MEMS module 1236 may be controlled by one or more of processors 1210 and/or 1212 to implements some or all of the functions of processor 110 of FIG. 1. MEMS module 1236 may include MEMS device 218 as shown in and described with respect to FIG. 2 through FIG. 5, for example, and which may be driven non-resonantly to achieve non-resonant operation of MEMS device 218 and/or scanner system 100 for example as shown in and described with respect to FIG. 6 through FIG. 11. In one or more embodiments, MEMS module 1236 may comprise a scanner for scanning target 230 such as a bar code represented by target/display 1240, and/or may comprise a MEMS based display for displaying an image projected by MEMS module 1236 where the image may likewise be represented by target/display 1240. In one or more embodiments, a scanned beam display engine may comprise video/graphics block 1220 having a video controller to provide video information 1238 to MEMS module 1236 to display an image represented by target/display 1240. In one or more embodiments, such a MEMS module 1236 may include MEMS device 218 as described herein. In particular embodiments, MEMS device 218 may comprise a biaxial mirror system wherein mirror 428 may reflect a beam from laser 216 in two dimensions to generate a two-dimensional image. However, these are merely example implementations for MEMS module 1236 within information handling system 1200, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to a non-resonant drive mode for adaptive trajectory of a scanner system and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
  a laser to emit a beam of light;

a MEMS device having a mirror to reflect the beam of light emitted by the laser, the MEMS device having a resonant frequency associated therewith;

a scan line generator circuit to provide a drive signal to the MEMS device to move the mirror and direct the reflected beam of light in a motion responsive to the drive signal to scan a target; and a target imager circuit to receive a reflectance profile of the target in response to the scan to decode information represented by the target;

wherein the drive signal provided to the MEMS device causes the MEMS device to operate in a non-resonant mode, and wherein the drive signal provided to the MEMS device, in response to an initial scan of a target, is capable of adapting to increase readability of the target, or to reduce a time to read the target, or combinations thereof, in a subsequent scan by driving the MEMS device in a non-resonant mode.

2. The apparatus as claimed in claim 1, wherein the drive signal is capable of adapting to reduce or minimize a time to startup the MEMS device, or to reduce or minimize a time to shut down the MEMS device, or combinations thereof.

3. The apparatus as claimed in claim 1, wherein the drive signal is capable of adapting to a known position of the MEMS device with respect to time to control gating of processing of incoming information about the target, or to control the laser to be active during predetermined periods of time during the scan, or combinations thereof.

4. The apparatus as claimed in claim 1, wherein the drive signal is capable of adapting to tailor a velocity of the scan across the target based at least in part on a location of the target within a field of view, to reduce or minimize velocity deviation of the scan from a constant value, to tailor the velocity of the scan across the target based at least in part on a module width of the target, or combinations thereof.

5. The apparatus as claimed in claim 1, wherein the drive signal is capable of adapting to vary a frequency at which the MEMS device is driven to increase or optimize readability of the target, or to reduce a time to read the target, or combinations thereof.

6. The apparatus as claimed in claim 1, wherein the drive signal is capable of adapting to vary a scan angle of the scan to increase or optimize readability of the target, or to reduce a time to read the target, or combinations thereof.

7. The apparatus as claimed in claim 1, wherein the drive signal is capable of adapting to direct the light beam in a spot at a desired location within a field of view, or to redirect the field of view to a location of the target to increase readability of the target, or to redirect the field of view to a location of the target to reduce a time to read the target, or combinations thereof.

8. The apparatus as claimed in claim 1, wherein the drive signal is capable of adapting to change a frequency of the drive signal, an amplitude of the drive signal, a shape of the drive signal, a phase of a drive signal, or a frequency component of the drive signal, or combinations thereof, to increase or optimize readability of the target, or to reduce a time to read the target, or combinations thereof.

9. The apparatus as claimed in claim 1, further comprising a filter to sufficiently attenuate components of the drive signal at the resonant frequency of the MEMS device, or near the resonant frequency of the MEMS device, or combinations thereof.

10. The apparatus as claimed in claim 1, further comprising a filter to sufficiently attenuate components of the drive at the resonant frequency of the MEMS device, or near the resonant frequency of the MEMS device, or combinations thereof, the filter comprising an analog filter, a digital filter, or combinations thereof.

11. The apparatus as claimed in claim 1, further comprising a filter to sufficiently attenuate components of the drive at the resonant frequency of the MEMS device, or near the resonant frequency of the MEMS device, or combinations thereof, the filter comprising a low pass filter, a high pass filter, a notch filter, or a band rejection filter, or combinations thereof.

12. The apparatus as claimed in claim 1, further comprising a filter to sufficiently attenuate components of the drive at the resonant frequency of the MEMS device, or near the resonant frequency of the MEMS device, or combinations thereof, the drive signal being generated at least in part from signal values stored in a memory, the filter being realized at least in part via pre-filtering of the values stored in the memory.

13. The apparatus as claimed in claim 1, the drive signal being capable of including a direct current offset to cause the mirror to be offset in a direction off axis from a user pointing axis.

14. The apparatus as claimed in claim 1, the drive signal provided to the MEMS device being capable of reducing or eliminating a resonant response of the MEMS device.

15. An information handling system, comprising:

a processor;

a memory coupled to said processor; and a MEMS module capable of being controlled by said processor by a program stored in the memory, said MEMS module comprising:

a laser to emit a beam of light;

a MEMS device having a mirror to reflect the beam of light emitted by the laser, the MEMS device having a resonant frequency associated therewith;

a scan line generator circuit to provide a drive signal to the MEMS device to move the mirror and direct the reflected beam of light in a motion responsive to the drive signal to scan a target; and a target imager circuit to receive a reflectance profile of the target in response to the scan to decode information represented by the target;

wherein the drive signal provided to the MEMS device causes the MEMS device to operate in a non-resonant mode, and wherein the drive signal provided to the MEMS device, in response to an initial scan of a target, is capable of adapting to increase readability of the target, or to reduce a time to read the target, or combinations thereof, in a subsequent scan by driving the MEMS device in a non-resonant mode.

16. The information handling system as claimed in claim 15, wherein the drive signal is capable of adapting to reduce or minimize a time to startup the MEMS device, or to reduce or minimize a time to shut down the MEMS device, or combinations thereof.

17. The information handling system as claimed in claim 15, wherein the drive signal is capable of adapting to a known position of the MEMS device with respect to time to control gating of processing of incoming information about the target, or to control the laser to be active during predetermined periods of time during the scan, or combinations thereof.

18. The information handling system as claimed in claim 15, wherein the drive signal is capable of adapting to tailor a velocity of the scan across the target based at least in part on a location of the target within a field of view, to reduce or minimize velocity deviation of the scan from a constant value, to tailor the velocity of the scan across the target based at least in part on a module width of the target, or combinations thereof.

19. The information handling system as claimed in claim 15, wherein the drive signal is capable of adapting to vary a frequency at which the MEMS device is driven to increase or optimize readability of the target, or to reduce a time to read the target, or combinations thereof.

20. The information handling system as claimed in claim 15, wherein the drive signal is capable of adapting to vary a scan angle of the scan to increase or optimize readability of the target, or to reduce a time to read the target, or combinations thereof.

21. The information handling system as claimed in claim 15, wherein the drive signal is capable of adapting to direct the light beam in a spot at a desired location within a field of view, or to redirect the field of view to a location of the target to increase readability of the target, or to redirect the field of view to a location of the target to reduce a time to read the target, or combinations thereof.

22. The information handling system as claimed in claim 15, wherein the drive signal is capable of adapting to change a frequency of the drive signal, an amplitude of the drive signal, a shape of the drive signal, a phase of a drive signal, or a frequency component of the drive signal, or combinations thereof, to increase or optimize readability of the target, or to reduce a time to read the target, or combinations thereof.

23. The information handling system as claimed in claim 15, further comprising a filter to sufficiently attenuate components of the drive at the resonant frequency of the MEMS device, or near the resonant frequency of the MEMS device, or combinations thereof.

24. The information handling system as claimed in claim 15, further comprising a filter to sufficiently attenuate components of the drive at the resonant frequency of the MEMS device, or near the resonant frequency of the MEMS device, or combinations thereof, the filter comprising an analog filter, a digital filter, or combinations thereof.

25. The information handling system as claimed in claim 15, further comprising a filter to sufficiently attenuate components of the drive at the resonant frequency of the MEMS device, or near the resonant frequency of the MEMS device, or combinations thereof, the filter comprising a low pass filter, a high pass filter, a notch filter, or a band rejection filter, or combinations thereof.

26. The information handling system as claimed in claim 15, further comprising a filter to sufficiently attenuate components of the drive at the resonant frequency of the MEMS device, or near the resonant frequency of the MEMS device, or combinations thereof, the drive signal being generated at least in part from signal values stored in a memory, the filter being realized at least in part via pre-filtering of the values stored in the memory.

27. The information handling system as claimed in claim 15, the drive signal being capable of including a direct current offset to cause the mirror to be offset in a direction off axis from a user pointing axis.

28. The information handling system as claimed in claim 15, the drive signal provided to the MEMS device being capable of reducing or eliminating a resonant response of the MEMS device.

* * * * *